US007359794B2

(12) United States Patent
Hakariya et al.

(10) Patent No.: US 7,359,794 B2
(45) Date of Patent: Apr. 15, 2008

(54) CONTROL DEVICE FOR INTERNAL COMBUSTION ENGINE

(75) Inventors: Masashi Hakariya, Nagoya (JP); Takashi Tsunooka, Gotenba (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/592,312

(22) PCT Filed: Jan. 30, 2006

(86) PCT No.: PCT/JP2006/301908

§ 371 (c)(1),
(2), (4) Date: Sep. 11, 2006

(87) PCT Pub. No.: WO2006/082943

PCT Pub. Date: Aug. 10, 2006

(65) Prior Publication Data

US 2007/0198166 A1 Aug. 23, 2007

(30) Foreign Application Priority Data

Feb. 3, 2005 (JP) ............................ 2005-027217

(51) Int. Cl.
*G06F 19/00* (2006.01)
*G01M 19/00* (2006.01)
*F02D 45/00* (2006.01)

(52) U.S. Cl. ...................... 701/111; 73/118.2; 123/436

(58) Field of Classification Search ............... 701/111, 701/102, 103, 110, 114; 123/436, 316; 73/118.2
See application file for complete search history.

(56) References Cited

U.S. PATENT DOCUMENTS 7,194,898 B2 * 3/2007 Machida et al. .......... 73/117.3
2004/0129249 A1 7/2004 Kondo
2005/0065707 A1 3/2005 Kaga

FOREIGN PATENT DOCUMENTS

DE 103 55 303 A1 6/2004
JP A-2001-234798 8/2001
JP A-2002-070633 3/2002

* cited by examiner

*Primary Examiner*—Hieu T. Vo
(74) *Attorney, Agent, or Firm*—Oliff & Berridge, PLC

(57) ABSTRACT

An intake pressure is successively detected by a pressure sensor, and an intake pressure derivative is calculated. Next, a peak pressure detecting range for each cylinder is set based on the intake pressure derivative. Next, an upward peak pressure and a downward peak pressure of the intake pressure, included in the peak pressure detecting range, are detected for each cylinder. Next, an intake pressure drop for each cylinder is calculated from the upward peak pressure and the downward peak pressure. The in-cylinder charged air amount is calculated based on the intake pressure drop.

15 Claims, 12 Drawing Sheets

CONTROL DEVICE FOR INTERNAL COMBUSTION ENGINE

FIELD OF THE INVENTION

The present invention relates to a control device for an internal combustion engine.

BACKGROUND ART

In a known internal combustion engine having a plurality of cylinders, in which an intake pipe air amount, which is an amount of air existing in an intake pipe from a throttle valve to an intake valve, changes when the intake stroke is executed, it is judged based on a crank angle whether the intake stroke of the i-th cylinder is executed, a change of the intake pipe air amount is calculated when it is judged that the intake stroke of the i-th cylinder is executed, and an in-cylinder charged air amount, which is an amount of air charged in the i-th cylinder, is calculated based on the change of the intake pipe air amount (see Japanese Unexamined Patent Publication No. 2001-234798).

A change of the intake pipe air amount can be calculated, for example, in the form of a difference between the intake pipe air amount at the starting timing of the intake stroke and that at the ending timing of the intake stroke. Specifically, when the crank angle becomes equal to a preset value representing the open-starting timing of the intake valve and stored in advance, the intake pipe air amount at this timing is calculated. When the crank angle becomes equal to another preset value representing the closing timing of the intake valve and stored in advance, the intake pipe air amount at this timing is also calculated. The difference between the intake pipe air amounts is then calculated.

However, if the actual open-starting timing or closing timing of the intake valve deviates from the respective preset value, the intake pipe air amount at the starting or ending timing of the intake stroke can no longer be correctly calculated and the in-cylinder charged air amount cannot be correctly calculated, accordingly.

DISCLOSURE OF THE INVENTION

It is, therefore, an object of the present invention to provide a control device, for an internal combustion engine, which is capable of correctly calculating the in-cylinder charged air amount.

According to the present invention, there is provided a control device for an internal combustion engine having a plurality of cylinders, comprising: intake pressure drop detecting means for detecting an intake pressure drop for each cylinder, the intake pressure drop being a drop of an intake pressure caused by the execution of the intake stroke; and control means for controlling the engine based on the intake pressure drop for each cylinder, wherein the intake pressure drop detecting means detects the intake pressure successively, calculates an intake pressure derivative from the detected intake pressure, sets a peak pressure detecting range for each cylinder based on the intake pressure derivative, detects upward and downward peak pressures of the intake pressure included in the peak pressure detecting range for each cylinder, and calculates the intake pressure drop for each cylinder from the corresponding upward and downward peak pressures.

BEST MODE FOR CARRYING OUT THE INVENTION

Figure 1:
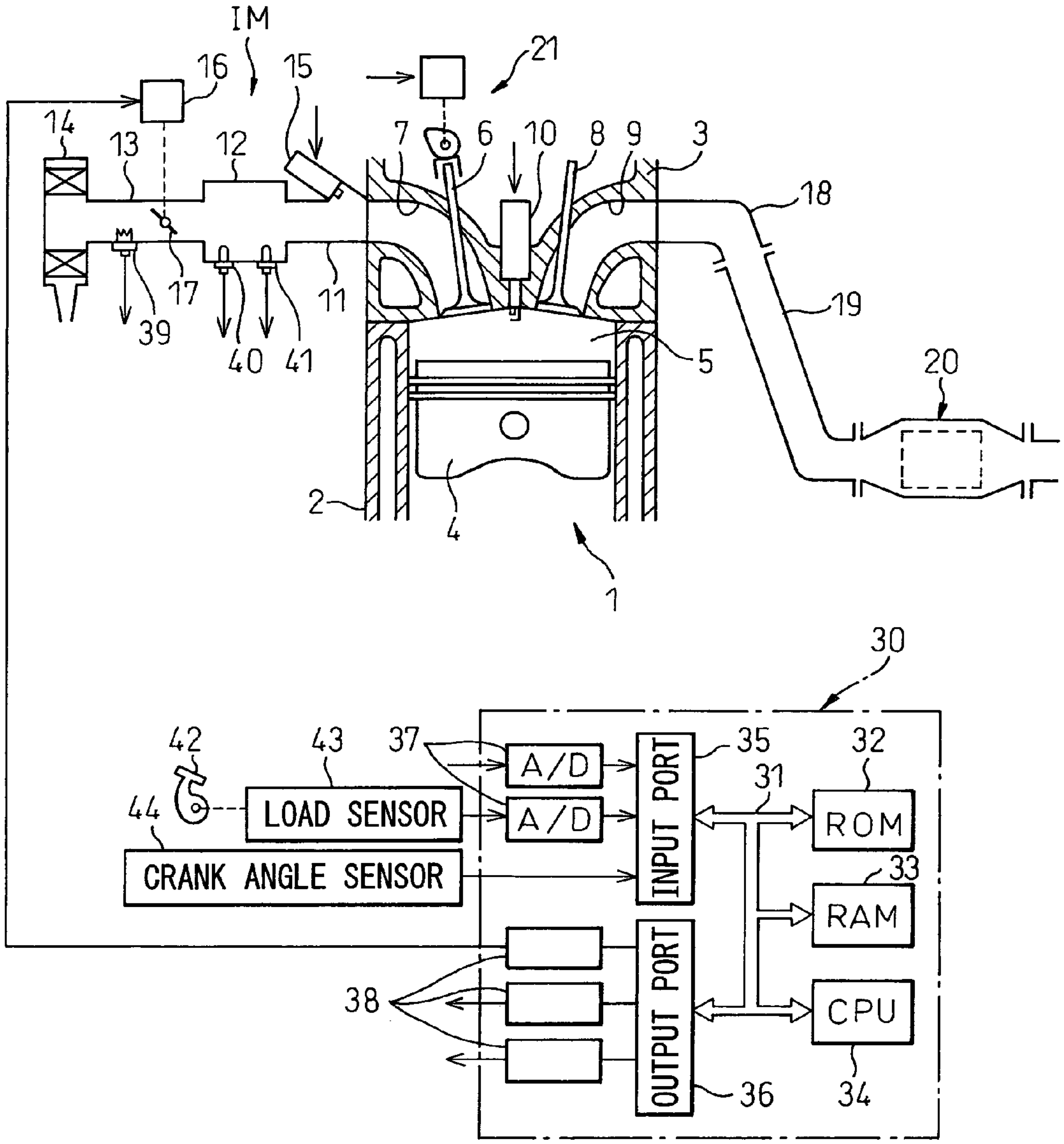
FIG. 1 is an overall view of an internal combustion engine.

FIG. 1 illustrates a case where the present invention is applied to a four-stroke internal combustion engine of a spark ignition type. However, the present invention may also be applied to an internal combustion engine of a compression ignition type and a two-stroke internal combustion engine.

With reference to FIG. 1, reference numeral 1 denotes an engine body having, for example, eight cylinders, 2 denotes a cylinder block, 3 denotes a cylinder head, 4 denotes a piston, 5 denotes a combustion chamber, 6 denotes an intake valve, 7 denotes an intake port, 8 denotes an exhaust valve, 9 denotes an exhaust port, and 10 denotes a spark plug. The intake port 7 is connected to a surge tank 12 through respective intake branches 11, and the surge tank 12 is connected to an air cleaner 14 through an intake duct 13. A fuel injector 15 is arranged in the intake branch 11, and a throttle valve 17 driven by a step motor 16 is arranged in the intake duct 14. In this specification, an intake passage portion comprising the intake duct 13 downstream of the throttle valve 17, the surge tank 12, the intake branch 11 and the intake port 7 is referred to as an intake pipe IM.

The exhaust port 9 is connected to a catalytic converter 20 through an exhaust manifold 18 and an exhaust pipe 19. The catalytic converter 20 is communicated with the atmosphere through a muffler that is not shown. Note that the intake strokes of the internal combustion engine shown in FIG. 1 are in order of #1-#8-#4-#3-#6-#5-#7-#2.

The intake valve 6 of each cylinder is opened and closed by an intake valve drive unit 21. The intake valve drive unit 21 includes a cam shaft and a change-over mechanism for selectively changing over the rotational angle of the cam shaft relative to the crank angle between the advancing side and the retarding side. When the rotational angle of the cam shaft is advanced, the open-starting timing VO and the closing timing VC of the intake valve 6 are advanced as represented by AD in FIG. 2 and, hence, the valve open timing of is advanced. When the rotational angle of the cam shaft is retarded, on the other hand, the open-starting timing VO and the closing timing VC of the intake valve 6 are retarded as represented by RT in FIG. 2 and, hence, the valve open timing is retarded. In this case, the valve open timing (phase) is varied while maintaining the lifting amount and the working angle (opening period) of the intake valve 6. In the internal combustion engine shown in FIG. 1, the open timing of the intake valve 6 is changed over to the advancing side AD or to the retarding side RT depending on the engine operating condition. Note that the present invention can also be applied when the open timing of the intake valve 6 is varied continuously or the lifting amount or the working angle is varied.

An electronic control unit 30 comprises a digital computer and includes a ROM (read-only memory) 32, a RAM (random access memory 33), a CPU (microprocessor) 34, an input port 35 and an output port 36, which are connected to each other through a bidirectional bus 31. The intake duct 13 upstream of the throttle valve 17 is provided with an air flow meter 39 for detecting an intake air flow rate that flows through the engine intake passage. Further, the surge tank 12 is provided with a pressure sensor 40 for successively detecting an intake pressure Pm (kPa) every 10 msec interval, for example, and a temperature sensor 41 for detecting an intake temperature Tm (K). The intake pressure Pm and intake temperature Tm are a pressure in the intake pipe IM and a temperature of gas existing in the intake pipe IM, respectively. Further, a load sensor 43 is connected to an accelerator pedal 42 for detecting a depression ACC of the accelerator pedal 42. The output signals of the sensors 39, 40, 41 and 43 are input to the input port 35 through corresponding AD converters 37. To the input port 35 is further connected a crank angle sensor 44 that generates an output pulse every time when the crank shaft rotates by, for example, 30°. The CPU 34 calculates an engine rotational speed NE based on the output pulses from the crank angle sensor 44. On the other hand, the output port 36 is connected, through drive circuits 38, to the spark plug 10, the fuel injector 15, the step motor 16 and the intake valve drive unit 21 so as to be controlled based on the output signals from the electronic control unit 30.

A fuel injection time TAU(i) for the i-th cylinder (i=1, 2, . . . , 8) is calculated based on, for example, the following equation (1):

$$TAU(i)=TAUb\cdot kD(i)\cdot kk \quad (1)$$

where TAUb is a basic fuel injection time, kD (i) is a variation correcting coefficient for the i-th cylinder, and kk is another correction coefficient.

The basic fuel injection time TAUb is a fuel injection time necessary for making the air-fuel ratio equal to a target air-fuel ratio. The basic fuel injection time TAUb is found in advance as a function of an engine operating condition such as the depression ACC of the accelerator pedal 42 and the engine speed NE, and is stored in the ROM 32 in the form of a map. The correction coefficient kk collectively expresses coefficients for the air-fuel ratio correction and for increment correction during acceleration, and is set to 1.0 when there is no need of effecting the correction.

If an amount of air charged in the cylinder of the i-th cylinder when the intake stroke is completed is referred to as an in-cylinder charged air amount Mc(i) (gram), the variation correcting coefficient kD(i) is for compensating variation of the in-cylinder charged air amounts Mc(i) among the cylinders. The variation correcting coefficient kD(i) for the i-th cylinder may be calculated based on the following equation (2):

$$kD(i)=\frac{Mc(i)}{Mcave} \quad (2)$$

where Mcave is an average value of the in-cylinder charged air amount Mc(i) (=ΣMc(i)/8, where "8" is the number of the cylinders).

When a deposit comprised mainly of carbon are formed on the inner surface of the intake pipe IM, the outer surface of the intake valve 6, or the like, there may be a variation in the in-cylinder charged air amounts Mc(i) since there exists a variation in the amounts of deposition of the cylinders. The variation in the in-cylinder charged air amounts Mc(i) will lead a variation in output torques of the cylinders. So, according to the embodiment of the present invention, the variation correcting coefficient kD(i) is introduced to compensate for the variation in the in-cylinder charged air amounts Mc(i).

Alternatively, the fuel injection time TAU(i) for the i-th cylinder can be calculated based on the following equation (3):

$$TAU(i)=Mc(i)\cdot kAF\cdot kk \quad (3)$$

where kAF is a correction coefficient for making the air-fuel ratio equal to a target air-fuel ratio.

Considering that an actual timing for fuel injection is ahead of a timing for calculating the fuel injection time TAU by a certain period of time, the in-cylinder charged air amount Mc(i) at a timing ahead of the timing for calculation by the certain period of time may be estimated and the estimated Mc(i) may be used in equation (3).

Both in the case where the fuel injection time TAU is calculated based on the equation (1) and in the case where TAU is calculated based on the equation (3), the in-cylinder charged air amount Mc(i) must be correctly obtained.

Figure 3:
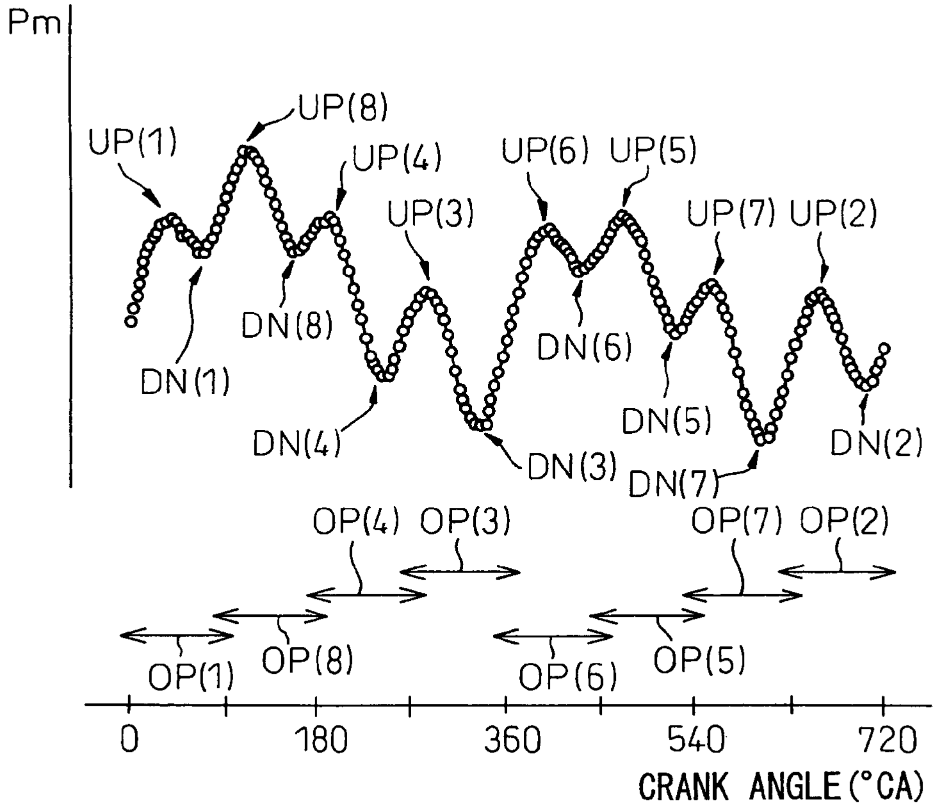
FIG. 3 is a diagram illustrating detected results of an intake pressure Pm.
Figure 4:
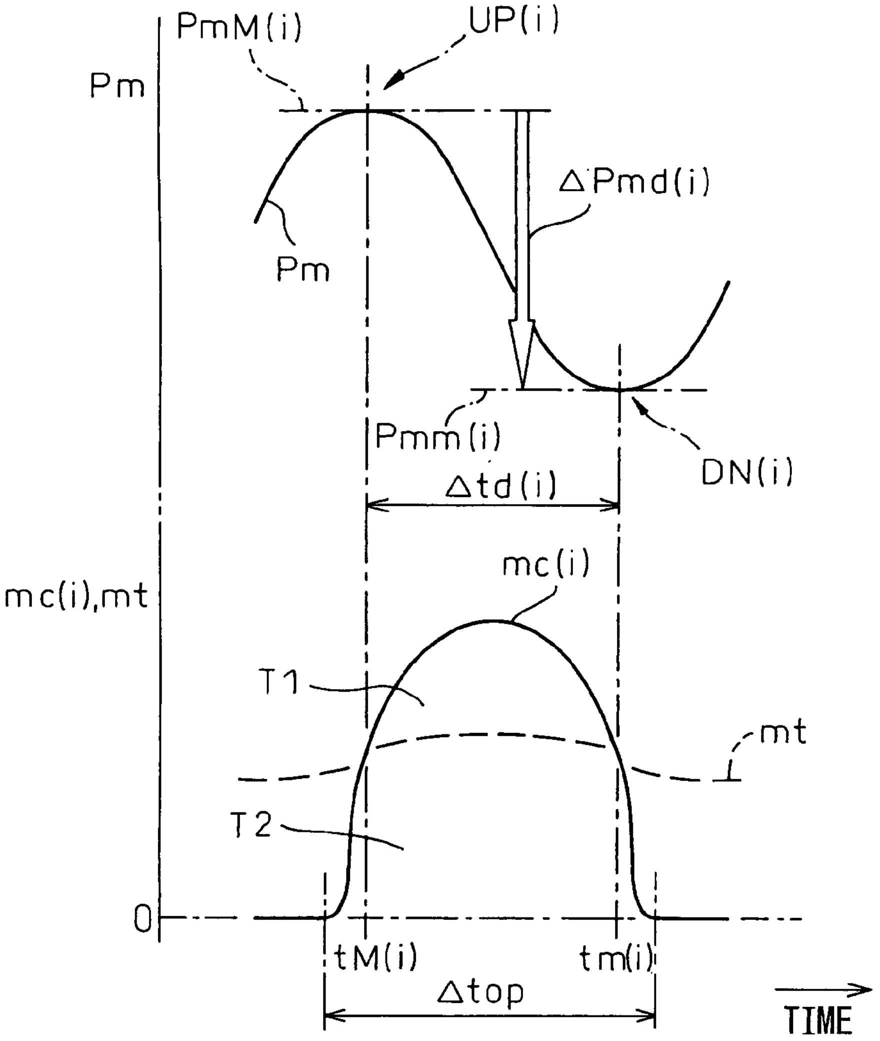
FIG. 4 is a time chart for explaining an intake pressure drop ΔPmd(i)
Figure 5:
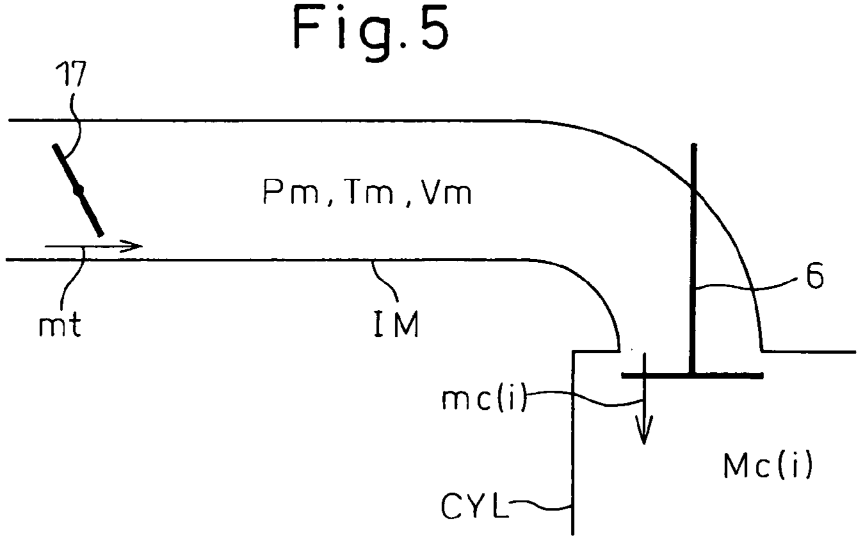
FIG. 5 is a diagram explaining a method of calculating an in-cylinder charged air amount Mc(i)

In the embodiment of the invention, the in-cylinder charged air amount Mc(i) is calculated based on an intake pressure drop ΔPmd(i) which is a drop or decrement of the intake pressure Pm caused by the execution of the intake stroke of the i-th cylinder. Referring next to FIGS. 3 to 5, the intake pressure drop ΔPmd(i) will first be described.

FIG. 3 illustrates the intake pressure Pm detected by the pressure sensor 40 at regular intervals over 720° crank angle (CA), for example. In FIG. 3, OP(i) (i=1, 2, . . . , 8) represents a period for opening the intake valve or the intake stroke of the i-th cylinder, and 0° CA represents the intake top dead center of the No. 1 cylinder #1. As will be understood from FIG. 3, when the intake stroke of a certain cylinder starts, the intake pressure Pm that has been increasing starts decreasing to form an upward peak in the intake pressure Pm. The intake pressure Pm further decreases and increases again, thus forming a downward peak in the intake pressure Pm. In this way, by successive excursion of the intake strokes of the cylinders, the upward peak and the downward peak are formed alternately in the intake pressure Pm. In FIG. 3, the upward peak and the downward peak formed by the execution of the intake stroke of the i-th cylinder are denoted by UP(i) and DN(i), respectively.

If the intake pressure Pm at the upward peak UP(i) is referred to as an upward peak pressure PmM(i) and the intake pressure Pm at the downward peak DN(i) is referred to as a downward peak pressure Pmm(i), as shown in FIG. 4, the intake pressure Pm decreases from the upward peak pressure PmM(i) to the downward peak pressure Pmm(i) by the execution of the intake stroke of the i-th cylinder. In this case, therefore, the intake pressure drop ΔPmd(i) is expressed by the following equation (4):

$$\Delta Pmd(i)=PmM(i)-Pmm(i) \quad (4)$$

On the other hand, when the intake valve 6 is made open, an in-cylinder intake air flow rate mc(i) (g/sec, see also FIG. 5), which is a flow rate of air exiting from the intake pipe IM and sucked in the cylinder CYL, starts increasing as shown in FIG. 4. Then, when the in-cylinder intake air flow rate mc(i) exceeds a throttle valve passing-through air flow rate mt (gram/sec, see also FIG. 5) which is a flow rate of air passing through the throttle valve 17 and entering the intake pipe IM, the intake pressure Pm starts decreasing. After that, the in-cylinder intake air flow rate mc(i) decreases, and when it is smaller than the throttle valve passing-through air flow rate mt, the intake pressure Pm starts increasing.

That is, considering that the air enters in the intake pipe IM through the throttle valve 17 by the throttle valve passing-through air flow rate mt and that the air exits from the intake pipe IM through the intake valve 6 by the in-cylinder intake air flow rate mc(i) by the excursion of the intake stroke of the i-th cylinder, the in-cylinder intake air flow rate mc(i) or the exiting air amount temporarily exceeds throttle valve passing-through air flow rate mt or the entering air amount. Therefore, the intake pressure Pm which is the pressure in the intake pipe IM decreases by the intake pressure drop ΔPmd(i).

The in-cylinder charged air amount Mc(i) is obtained by time-integrating the in-cylinder intake air flow rate mc(i). Assuming that the effect of overlapping of the intake valve opening period OP(i) (see FIG. 3) on the in-cylinder charged air amount Mc(i) or on the variation correcting coefficient kD(i) is negligible, the in-cylinder charged air amount Mc(i) can be expressed by the following equation (5):

$$Mc(i)=\int_{tM(i)}^{tm(i)}(mc(i)-mt)dt+mt\cdot\frac{\Delta td(i)+\Delta\text{top}}{2} \quad (5)$$

where tM(i) is an upward peak formed time at which the upward peak UP(i) is formed in the intake pressure Pm, tm(i) is a downward peak formed time at which a downward peak UP(i) is formed in the intake pressure Pm, Δtd(i) is a time interval (sec) from the upward peak formed time tM(i) to the downward peak formed time tm(i), and Δtop is an intake valve opening period (sec) (see FIG. 4).

In the equation (5), the first term of the right side represents an area of a portion T1 shown in FIG. 4 or a portion surrounded by the in-cylinder intake air flow rate mc(i) and the throttle valve passing-through air flow rate mt, and the second term of the right side represents an area a portion T2 shown in FIG. 4 or a portion surrounded by the in-cylinder intake air flow rate mc(i), the throttle valve passing-through air flow rate mt and the straight line mc(i) =0, which is approximated by a trapezoid.

As described above, the in-cylinder intake air flow rate mc(i) temporarily exceeds the throttle valve passing-through air flow rate mt by the execution of the intake stroke. Therefore, the in-cylinder charged air amount Mc(i) obtained by time-integrating the in-cylinder intake air flow rate mc(i) also exceeds the time-integrated value of the throttle valve passing-through air flow rate mt. The portion T1 represents an excess portion of the in-cylinder charged air amount Mc(i) relative to the integrated value of the throttle valve passing-through air flow rate mt which is caused by the execution of the intake stroke.

Accordingly, in general, the in-cylinder charged air amount is divided into a first air amount represented by an area of the portion T1 and a second air amount represented by an area of the portion T2, the first air amount being an excess of the in-cylinder charged air amount relative to a throttle valve passing-through air amount, caused by the execution of the intake stroke, and the in-cylinder charged air amount is calculated by adding up the first air amount and the second air amount together.

On the other hand, the mass preservation law regarding the intake pipe IM is expressed by the following equation (6), using the state equation for air in the intake pipe IM:

$$\frac{dPm}{dt}=\frac{Ra\cdot Tm}{Vm}\cdot(mt-mc(i)) \quad (6)$$

where Vm is a volume ($m^3$) of the intake pipe IM, and Ra is the gas constant per 1 mol of air (see FIG. 5).

The intake pressure Pm decreases by an intake pressure drop ΔPmd(i) from the time tM(i) to time tm(i). Therefore, if Vm/(Ra·Tm) is collectively expressed by a parameter Km and the throttle valve passing-through air flow rate mt is expressed by an average value mtave thereof, the equation (5) can be rewritten as in the following equation (7), using the equation (6):

$$Mc(i)=\Delta Pmd(i)\cdot Km+mtave\cdot\frac{\Delta td(i)+\Delta\text{top}}{2} \quad (7)$$

Therefore, if the intake pressure Pm is detected by the · pressure sensor 40 to calculate the intake pressure drop ΔPmd(i), the intake air temperature Tm is detected by the temperature sensor 42 to calculate the parameter Km, the throttle valve passing-through air flow rate mt is detected by the air flow meter 39 to calculate an average value mtave thereof, and times tM(i) and tm(i) are detected from the intake pressure Pm and the average mtave of the throttle valve passing-through air flow rate to calculate the time interval Δtd(i)(=tm(i)−tM(i)), the in-cylinder charged air amount Mc(i) can be calculated using the equation (7). Note that the time period Δtop for opening the intake valve has been stored in advance in the ROM 32.

In order to correctly calculate the intake pressure drop ΔPmd(i), the upward peak pressure PmM(i) and the downward peak pressure Pmm(i) must be correctly detected, i.e., the upward peak UP(i) and the downward peak DN(i) in the intake pressure Pm must be correctly determined. Next, how to determine the upward peak UP(i) and the downward peak DN(i) according to the embodiment of the invention will be explained.

As described above with reference to FIG. 3, when the intake stroke of the i-th cylinder is executed, one upward peak UP(i) and one downward peak DN(i) are formed in the intake pressure Pm. So, in the embodiment of the invention, a peak pressure detecting range RPK(i) is set for each cylinder, and the upward peak and the downward peak included in the peak pressure detecting range RPK(i) are considered as the upward peak UP(i) and the downward peak DN(i) for the i-th cylinder.

In this case, the peak pressure detecting range RPK(i) for the i-th cylinder must be set to include only the upward peak UP(i) and the downward peak DN(i) for the i-th cylinder. Considering that these peaks UP(i) and DN(i) are formed by the execution of the intake stroke, the peak pressure detecting range RPK(i) for the i-th cylinder can be set based on the intake stroke timing OP(i) of the i-th cylinder (see FIG. 3), for example.

However, the actual open-starting timing VO or the closing timing VC of the intake valve 6 (see FIG. 2) may be deviated from the preset timing. Therefore, the time interval from when the downward peak is formed in the previous cylinder until when the upward peak is formed in the present cylinder or from when the downward peak is formed in the present cylinder until when the upward peak is formed in the next cylinder, may be shortened. As a result, the peak pressure detecting range RPK(i) for the i-th cylinder may include the upward peak or the downward peak for another cylinder, or may not include the upward peak UP(i) or the downward peak DN(i) for the i-th cylinder.

On the other hand, whether the peak UP(i) or DN(i) is formed in the intake pressure Pm can be learned from a gradient or derivative DPm of the intake pressure Pm.

So, in the embodiment of this invention, the peak pressure detecting range RPK(i) is set based on the intake pressure derivative DPm.

Figure 6:
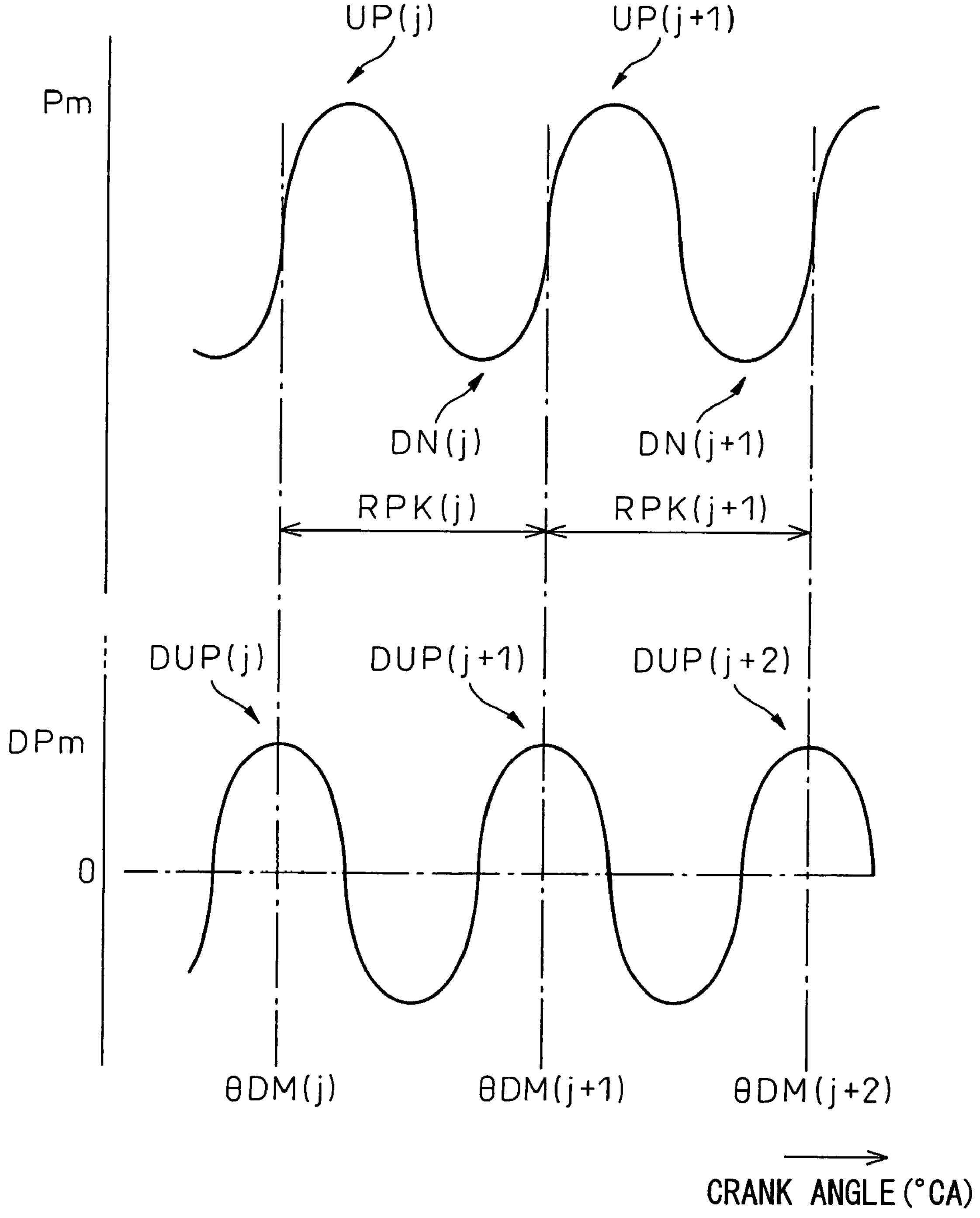
FIGS. 6 and 7 are time charts explaining a method of setting a peak pressure detecting range.

Specifically, as shown in FIG. 6, the intake pressure derivative DPm is calculated from the intake pressure Pm that is detected successively. Then, an upward peak DUP(j) (j=1, 2, . . . , 8) formed in the intake pressure derivative DPm is determined. In other words, a derivative upward peak timing θDM(j) (° CA) which is a crank angle at which the upward peak DUP(j) is formed in the intake pressure derivative DPm, where j represents the order of intake strokes.

After that, a period from the derivative upward peak timing θDM(j) until the next derivative upward peak timing θDM(j+1) is set to the peak pressure detecting range RPK(j) for the j-th cylinder. This ensures that one upward peak UP(j) and one downward peak DN(j) are included in the peak pressure detecting range RPK(j).

Figure 7:
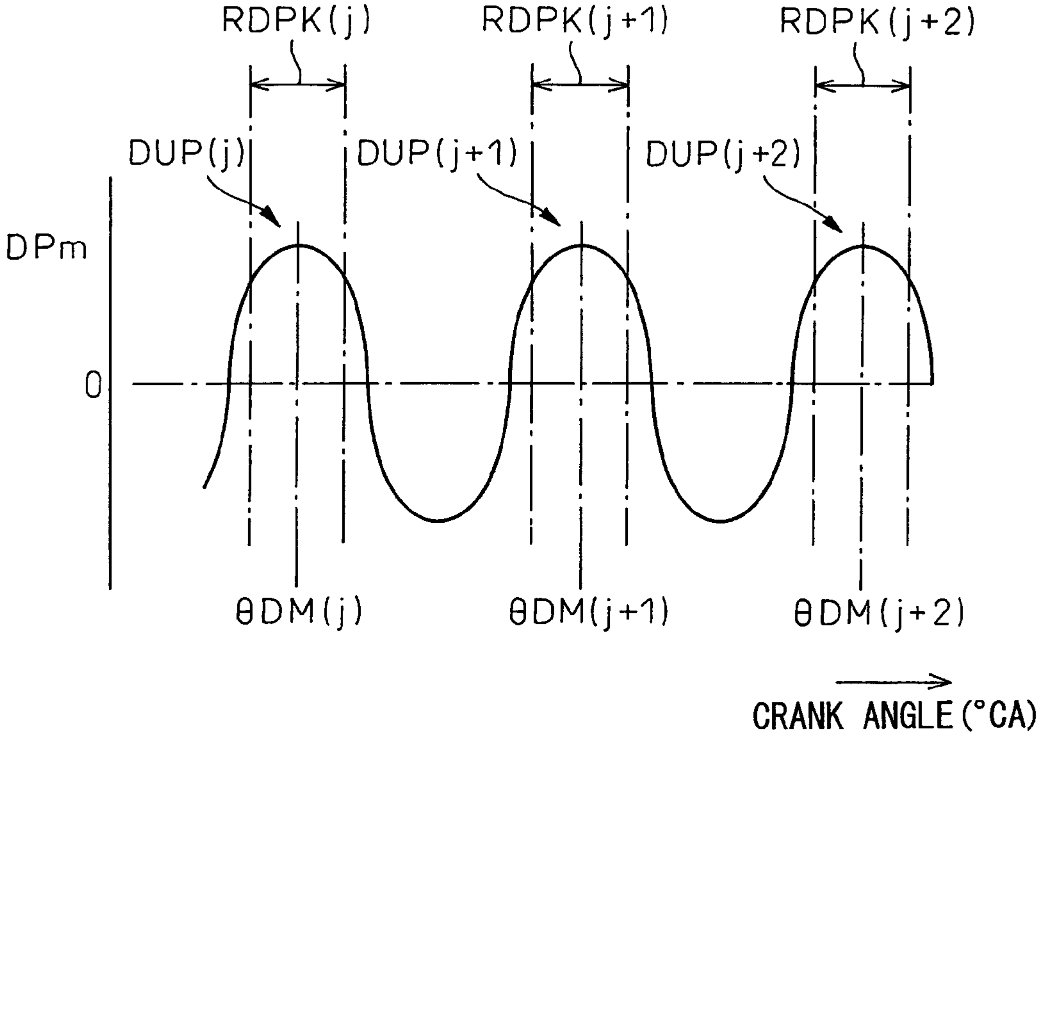

In the embodiment of the invention, further, a peak derivative detecting range RDPK(j) is set in advance, as shown in FIG. 7, and the upward peak of the intake pressure derivative DPm included in the peak derivative detecting range RDPK(j) is determined as the above-mentioned DUP (j).

Any range may be set to the peak derivative detecting range RDPK(j), as long as it includes a single upward peak of the intake pressure derivative DPm. In the embodiment of the invention, however, the peak derivative detecting range RDPK(j) is set based on the open timing of the intake valve of the j-th cylinder, i.e., the open-starting timing VO or closing timing VC of the intake valve (see FIG. 2).

Accordingly, in the embodiment of the invention, the peak pressure detecting range RPK(j) is set based on the intake pressure derivative DPm, or on the intake pressure derivative DPm and the open timing of the intake valve.

This enables an appropriate setting of the peak pressure detecting range RPK(i), even if the actual open-stating timing or closing timing of the intake valve 6 is deviated from the preset value and, hence, the intake pressure drop ΔPmd(i) is correctly calculated. As a result, the in-cylinder charged air amount Mc(i) is correctly detected.

Further, in the embodiment of the invention, an average of the intake pressure Pm detected over a plurality of cycles (one cycle=720° CA) is calculated, and the above-mentioned intake pressure drop ΔPmd(i) is calculated from the average of intake pressure. Specifically, the intake pressure Pm(θ) at the crank angle θ is first detected, and the cumulative value of the intake pressure Pm(θ) for every crank angle θ is then calculated (ΣPm(θ)=ΣPm(θ)+Pm(θ)), and the cumulative values of the intake pressure ΣPm(θ) are stored in the RAM 33. After that, when the number of times of cumulating of the intake pressure Pm(θ) reaches a preset number C1, the average intake pressure Pm(θ)ave is calculated for every crank angle θ (Pm(θ) ave=ΣPm(θ)/C1). The intake pressure drop ΔPmd(i) is then calculated from the average intake pressure Pm(θ)ave.

As mentioned above, the cumulative value of the intake pressure ΣPm(θ) is calculated every time when the intake pressure Pm(θ) is detected and the cumulative value ΣPm(θ) is stored, rather than the detected intake pressure Pm(θ). Therefore, there is no need to increase the capacity of the RAM 33. Further, the intake pressure drop ΔPmd(i) is calculated based on the intake pressure Pm(θ) detected for a plurality of number of times and, therefore, precision of calculation is enhanced. Note that the preset number C1 may be set in the order of, for example, several hundred.

In the embodiment of the present invention, further, it is judged whether the engine is operated under a preset reference condition, and the intake pressure Pm(θ) is detected and the cumulative value of the intake pressure ΣPm(θ) is renewed when it is judged that the engine is operated under the reference condition. Contrarily, when it is judged that the engine is not operated under the reference condition, detection of the intake pressure Pm(θ) is inhibited and the renewal of the cumulative value of the intake pressure ΣPm(θ) is also inhibited. That is, in the embodiment of the invention, the intake pressure drop ΔPmd(i) is calculated based only on the intake pressure Pm(θ) when the engine is being operated under the reference condition.

In this case, any engine operation may be set as the reference condition. In the embodiment of the invention, it is judged that the engine is operated under the reference condition when the open timing of the intake valve 6 is set to the advancing side AD shown in FIG. 2, the engine speed NE is substantially equal to a target speed for the idling operation NEid and the engine has been warmed up. Further, in an internal combustion engine in which the exhaust recirculation gas is supplied into the intake passage through an exhaust recirculation passage which connects the engine exhaust passage to the engine intake passage or in an internal combustion engine in which fuel vapor is supplied into the intake passage from a canister for temporarily accumulating the fuel vapor, the engine may be judged to be operated under the reference condition when the supply of the exhaust recirculation gas or the fuel vapor is stopped.

Figure 8:
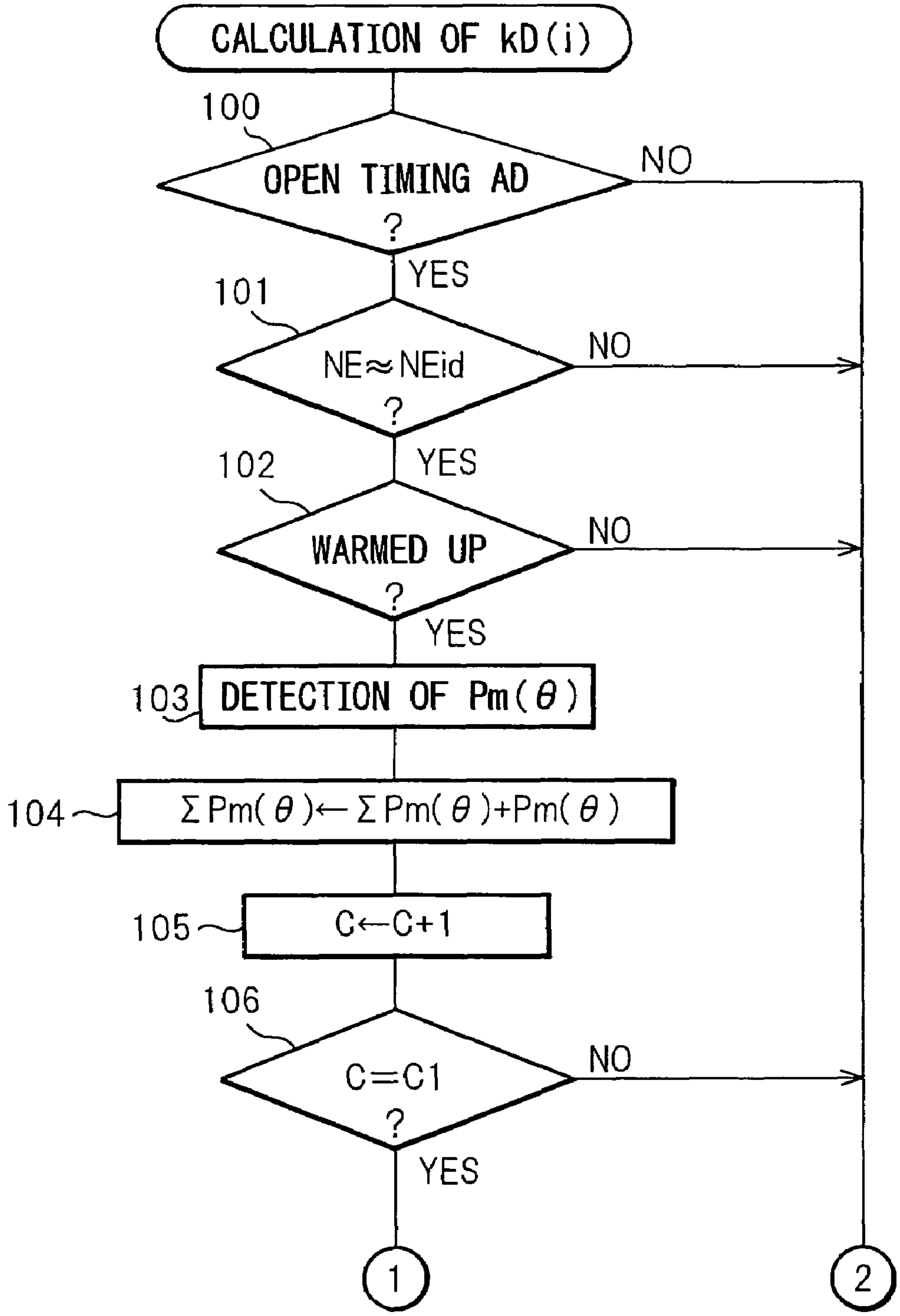
FIGS. 8 and 9 show a flowchart illustrating a routine for calculating a variation correcting coefficient kD(i)
Figure 9:
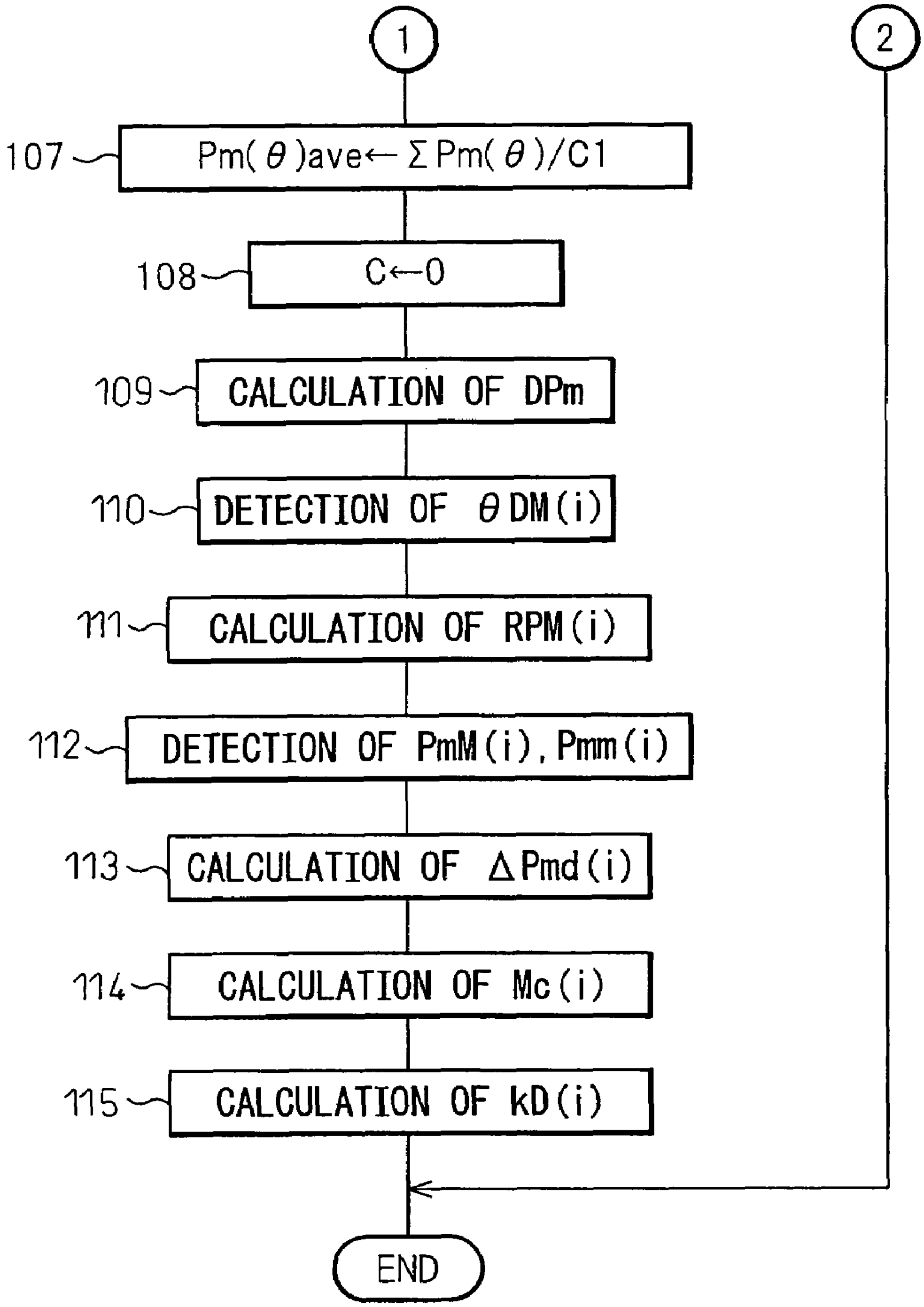

FIGS. 8 and 9 illustrate a routine for calculating the variation correcting coefficient kD(i) for the i-th cylinder according to the embodiment of the invention.

Figure 2:
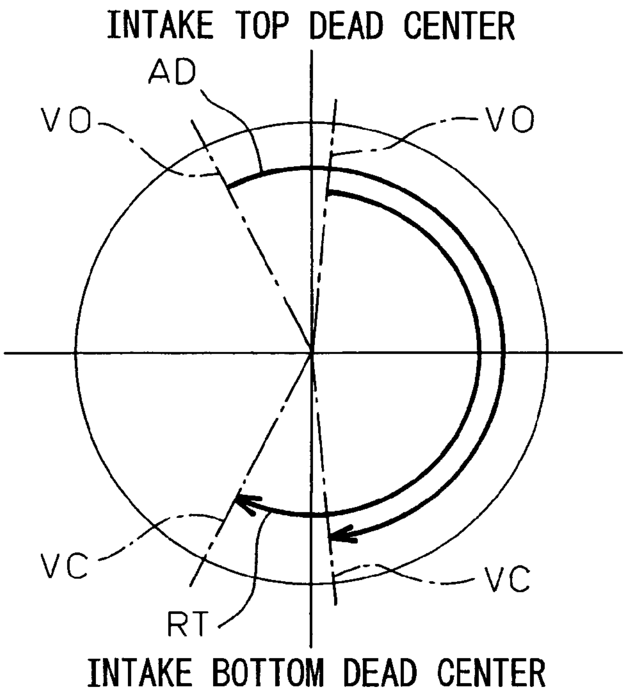
FIG. 2 is a diagram illustrating an open timing of an intake valve.

Referring to FIGS. 8 and 9, in step 100, it is judged whether the open timing of the intake valve 6 is set to the advancing side AD (see FIG. 2). When the open timing of the intake valve 6 is set to the advancing side AD, the routine proceeds to step 101 where it is judged whether the engine speed NE is substantially equal to a target idling speed NEid. When NE≈NEid, the routine proceeds to step 102 where it is judged whether the engine has been warmed up. When the engine has been warmed up, the routine proceeds to step 103. On the other hand, when it is judged in step 100 the open timing of the intake valve 6 has been set to the retarding side RT, NE≠NEid in step 101 or the engine has not been warmed up in step 102, the processing cycle is ended.

In step 103, the intake pressure Pm(θ) is detected. In the subsequent step 104, the cumulative value of the intake pressure ΣPm(θ) is calculated for every crank angle θ. In the subsequent step 105, a counter C that expresses the number of times of detecting the intake pressure PM(θ) or the number of times of cumulating is increased by 1. In the subsequent step 106, it is judged whether the counter C has reached the set number of times C1. When C<C1, the processing cycle is ended. When C=C1, the routine proceeds to step 107 where the average intake pressure Pm(θ)ave is calculated (Pm(θ) ave=ΣPm(θ)/C1). In the subsequent step 108, the counter C is cleared. In the subsequent step 109, the intake pressure derivative DPm is calculated from the average intake pressure Pm(θ)ave. In the subsequent step 110, the derivative upward peak timing θDM(i) for the i-th cylinder is detected (i=1, 2, . . . , 8). In the subsequent step 111, the peak pressure detecting range RPK(i) for the i-th cylinder is set. In the subsequent step 112, the upward peak pressure PmM(i) and the downward peak pressure Pmm(i) for the i-th cylinder are detected. In the subsequent step 113, the intake pressure drop ΔPmd(i) for the i-th cylinder is calculated using the equation (4). In the subsequent step 114, the in-cylinder charged air amount Mc(i) for the i-th cylinder is calculated using the equation (7). In the subsequent step 115, the variation correcting coefficient kD(i) for the i-th cylinder is calculated using the equation (2).

Figure 10:
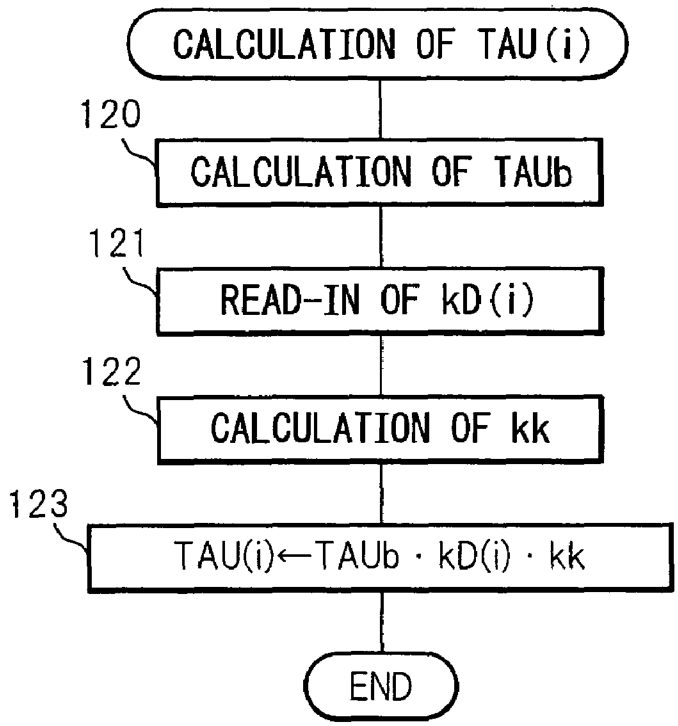
FIG. 10 shows a flowchart illustrating a routine for calculating a fuel injection time TAU(i)

FIG. 10 illustrates a routine for calculating the fuel injection time TAU(i) for the i-th cylinder according to the embodiment of the invention. This routine is executed by a predetermined interruption for every preset crank angle.

Referring to FIG. 10, in step 120, the basic fuel injection time TAUb is calculated. In the subsequent step 121, the variation correcting coefficient kD(i) for the i-th cylinder, calculated by the routine of FIGS. 8 and 9, is read in. In the subsequent step 122, the correction coefficient kk is calculated. In the subsequent step 123, the fuel injection time TAU(i) is calculated using the equation (1). The fuel injector 15 of the i-th cylinder injects fuel for the fuel injection time TAU(i).

Next, described below is another embodiment of the invention.

In the above-mentioned embodiment of the invention, detection of the intake pressure Pm(θ) is inhibited when it is judged that the engine is not operated under the reference condition. This means that a time is required for calculating the intake pressure drop ΔPmd(i) or the variation correcting coefficient kD(i).

So, in another embodiment of the invention, the intake pressure Pm(θ) is detected irrespective of the engine operating condition, the detected intake pressure Pm(θ) is converted with a conversion coefficient kC into an intake pressure Pm(θ)cnv at the engine being operated under the reference condition, and the intake pressure drop ΔPmd(i) is calculated from the converted intake pressure Pm(θ)cnv.

Specifically, according to another embodiment of the invention, the converted intake pressure Pm(θ)cnv is calculated from the following equation (8):

$$Pm(\theta)cnv = Pm(\theta)\cdot kC \tag{8}$$

Figure 11:
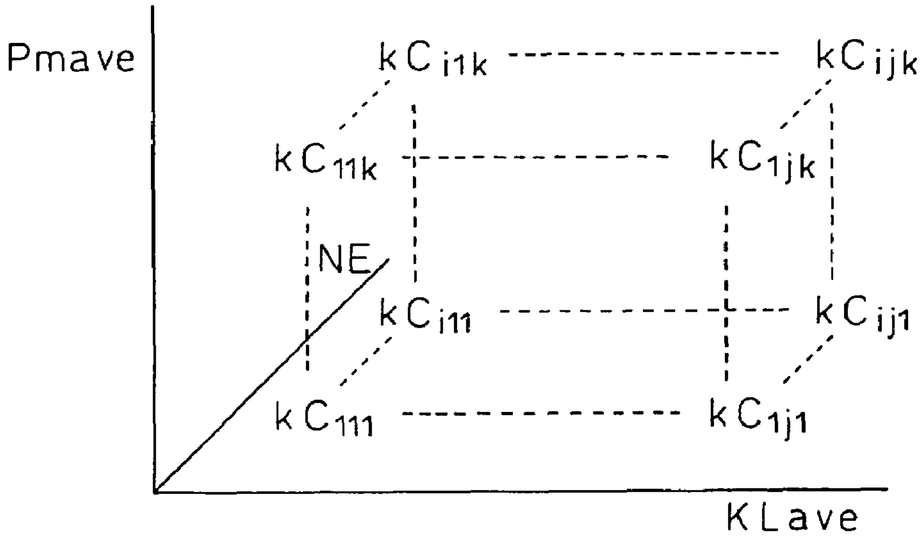
FIG. 11 is a diagram illustrating a conversion coefficient kC.

The conversion coefficient kC has been found in advance as a function of an average KLave of an engine load ratio, the average Pmave of the intake pressure Pm over one cycle and the engine speed NE, in the form of a map shown in FIG. 11, and is stored in the ROM 32. Note that the engine load ratio represents a charging efficiency of the engine.

Figure 12:
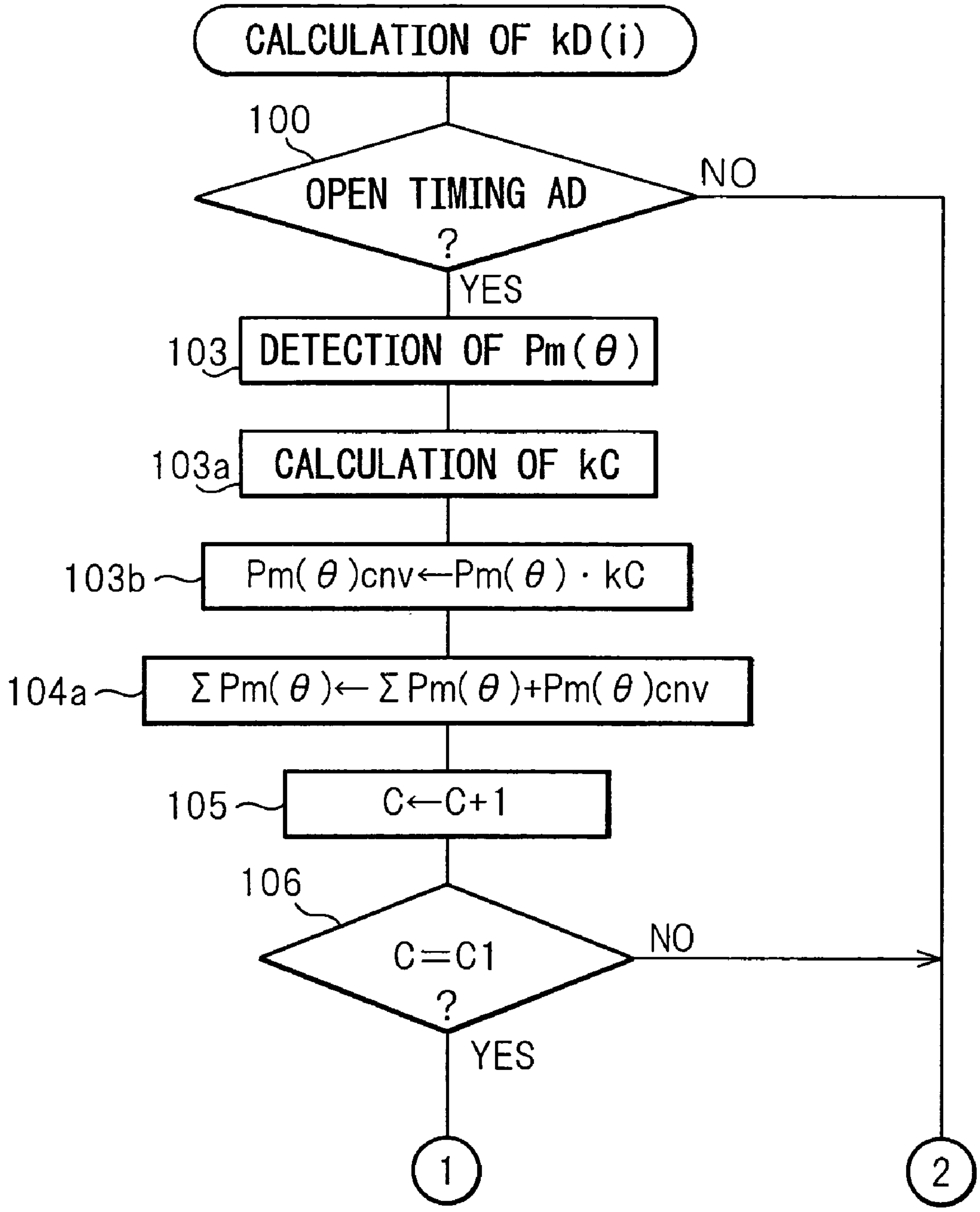
FIGS. 12 and 13 show a flowchart illustrating a routine for calculating a variation correcting coefficient kD(i), according to another embodiment of the present invention.
Figure 13:
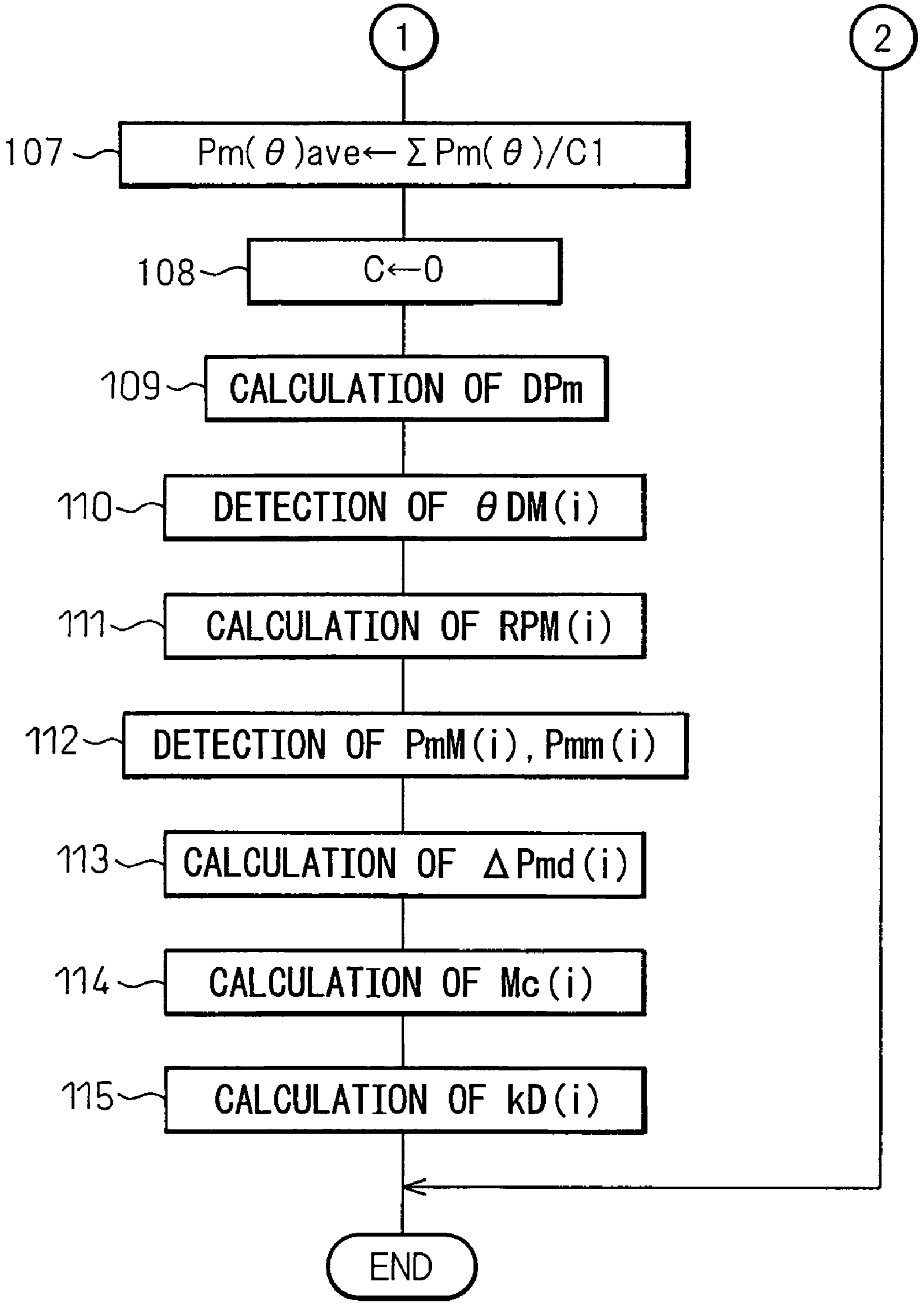
Figure 14:
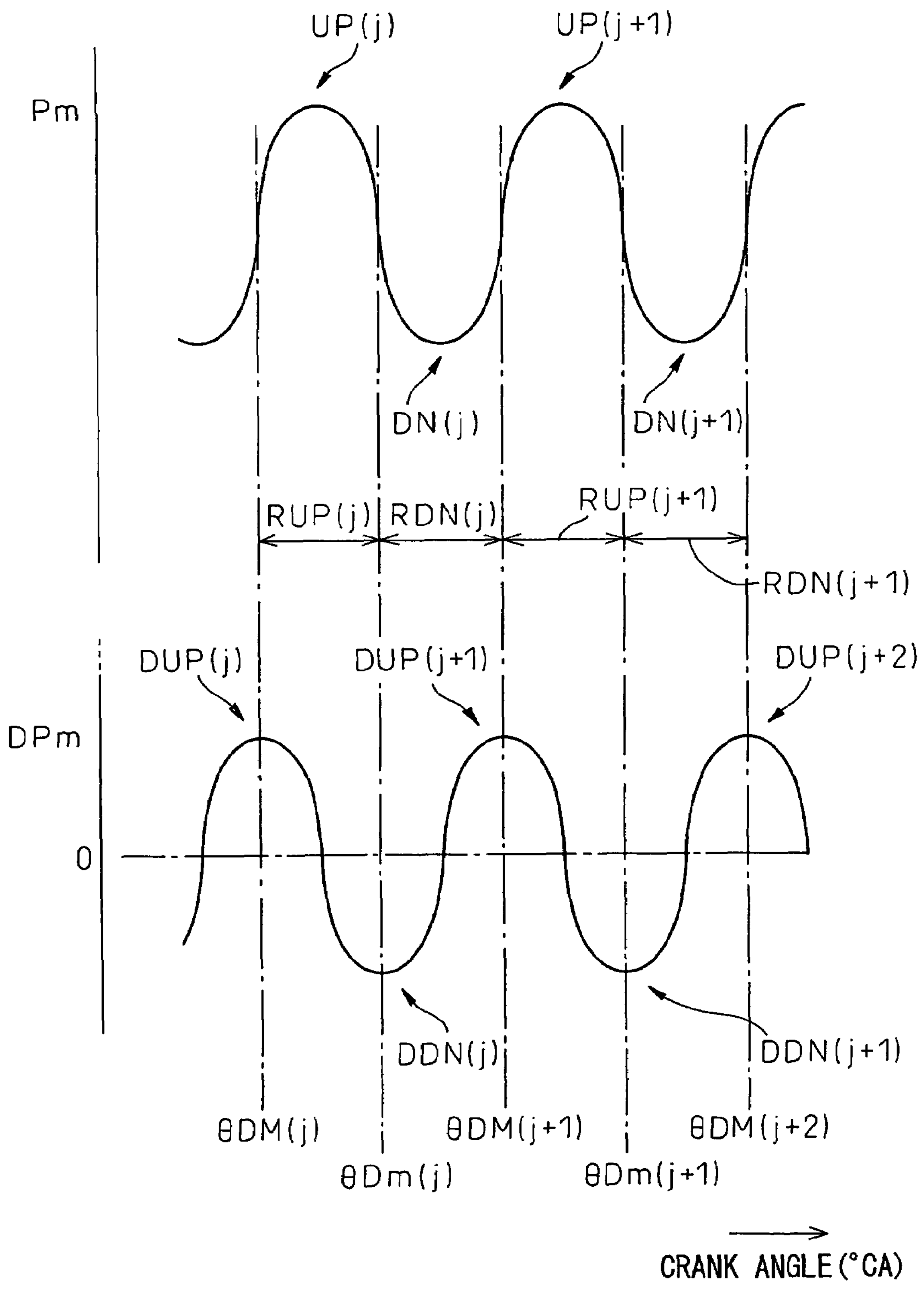
FIG. 14 is a time chart explaining another method of setting a peak pressure detecting range.
Figure 15:
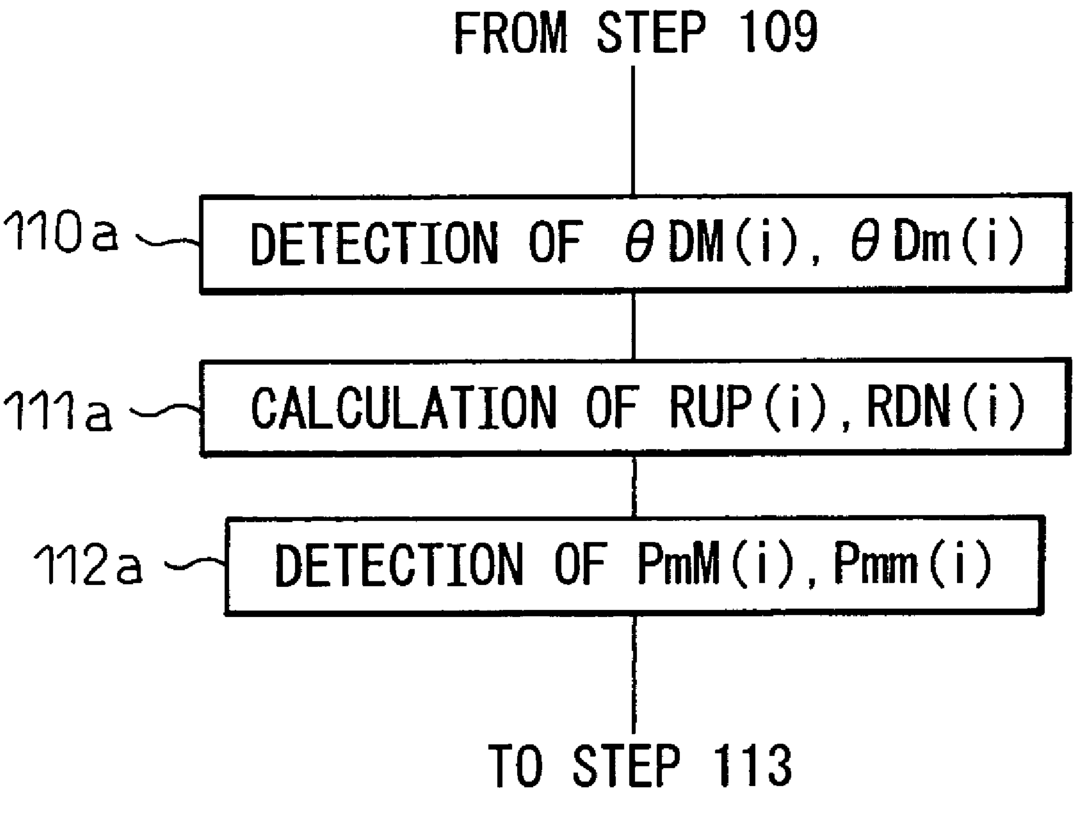
FIG. 15 shows a flowchart illustrating a routine for calculating a variation correcting coefficient kD(i), according to still another embodiment of the present invention.

FIGS. 12 and 13 illustrate a routine for calculating the variation correcting coefficient kD(i) for the i-th cylinder according to another embodiment of the invention. This routine is the same as the routine illustrated in FIGS. 8 and 9 except that steps 101, 102, 103 and 104 in the routine of FIGS. 8 and 9 are replaced with steps 103, 103*a*, 103*b* and 104*a*. Therefore, only the differences will be described below.

When it is judged that the open timing of the intake valve 6 has been set to the advancing side AD in step 100, the routine proceeds to step 103 where the intake pressure Pm(θ) is detected. In the subsequent step 103*a*, the conversion coefficient kC is calculated from the map of FIG. 11. In the subsequent step 103*b*, the converted intake pressure Pm(θ)cnv is calculated using the equation (8). In the subsequent step 104*a*, the cumulative value of the converted intake pressure Pm(θ) cnv is calculated to calculate the cumulative intake pressure ΣPm(θ) for every crank angle θ. Next, the routine proceeds to step 105.

Next, described below is still another embodiment of the invention.

In the above-mentioned embodiments of the invention, the peak pressure detecting range RPK(j) for the j-th cylinder is set based on the derivative upward peak timing θDM(j), as described above with reference to FIG. 6.

According to the still another embodiment, as shown in FIG. 13, a derivative downward peak timing θDm(j) (° CA), which is a crank angle at which a downward peak DDN(j) in the intake pressure derivative DPm is formed, is first detected in addition to the derivative upward peak timing θDM(j). Then, a period from the derivative upward peak timing θDM(j) to the derivative downward peak timing θDm(j) is set to an upward peak pressure detecting range RUP(j) for the j-th cylinder, and a period from the derivative downward peak timing θDm(j) to the derivative upward peak timing θDM(j+1) is set to a downward peak pressure detecting range RDN(j) for the j-th cylinder. Finally, the upward peak in the intake pressure Pm included in the upward peak pressure detecting range RUP(j) is determined as the upward peak UP(j) for the j-th cylinder, and the downward peak in the intake pressure Pm included in the downward peak pressure detecting range RDN(j) is determined as the downward peak DN(j) for the j-th cylinder.

In still another embodiment of the present invention, steps 110*a*, 111*a* and 112*a* are executed as substitute for steps 110, 111 and 112 in the routine of FIGS. 8 and 9 or the routine of FIGS. 12 and 13.

In step 110*a*, the derivative upward peak timing θDM(i) and the derivative downward peak timing θDm(i) for the i-th cylinder are detected. In the subsequent step 111*a*, the upward peak pressure detecting range RUP(i) and the downward peak pressure detecting range RDN(i) for the i-th cylinder are set. In the subsequent step 112*a*, the upward peak pressure PmM(i) included in the upward peak pressure detecting range RUP(i) and the downward peak pressure Pmm(i) included in the downward peak pressure detecting range RDN(i) are detected.

Note that, in the same manner as in the embodiment shown in FIG. 7, an upward peak derivative detecting range may be set in advance, and the upward peak of the intake pressure derivative DPm included in the upward peak derivative detecting range may be determined as the upward peak DUP(j). Similarly, a downward peak derivative detecting range may be set in advance, and the downward peak of the intake pressure derivative DPm included in the downward peak derivative detecting range may be determined as the downward peak DDN(j).

In the embodiments of the invention described above, the portion T2 shown in FIG. 4 is approximated by a trapezoid having an upper side Δtd(i) and a lower side Δtop. Alternatively, the portion T2 may be approximated by a rectangle having a side Δtd(i), for example. In this alternative, the above equation (7) is changed to the following equation (9):

$$Mci=\Delta Pmdi\cdot Km+mtave\cdot \Delta tdi \quad (9)$$

The invention claimed is:

1. A control device for an internal combustion engine having a plurality of cylinders, comprising:

intake pressure drop detecting means for detecting an intake pressure drop for each cylinder, the intake pressure drop being a drop of an intake pressure caused by the execution of the intake stroke; and control means for controlling the engine based on the intake pressure drop for each cylinder, wherein the intake pressure drop detecting means detects the intake pressure successively, calculates an intake pressure derivative from the detected intake pressure, sets a peak pressure detecting range for each cylinder based on the intake pressure derivative, detects upward and downward peak pressures of the intake pressure included in the peak pressure detecting range for each cylinder, and calculates the intake pressure drop for each cylinder from the corresponding upward and downward peak pressures.

2. A control device for an internal combustion engine according to claim 1, wherein the intake pressure drop detecting means sets the peak pressure detecting range based on the intake pressure derivative and an open timing of an intake valve.

3. A control device for an internal combustion engine according to claim 1, wherein the control device further comprises air amount calculating means for calculating an in-cylinder charged air amount of each cylinder based on the corresponding intake pressure drop, the in-cylinder charged air amount being an amount of air charged in the cylinder when the intake stroke is completed, and wherein the control means controls the engine based on the in-cylinder charged air amount of each cylinder.

4. A control device for an internal combustion engine according to claim 3, wherein air flows at a throttle valve passing-through air flow amount through a throttle valve into an intake passage portion from the throttle valve to an intake valve, and air flows at the in-cylinder charged air amount from the intake passage portion through the intake valve into the cylinder when the intake stroke is executed, wherein the in-cylinder charged air amount is divided into a first air amount and a second air amount, the first air amount being an excess of the in-cylinder charged air amount relative to the throttle valve passing-through air flow amount caused by the execution of the intake stroke, and wherein the air amount calculating means comprises means for calculating the first air amount of each cylinder based on the corresponding intake pressure drop, means for detecting the throttle valve passing-through air flow amount, means for calculating the second air amount of each cylinder based on the throttle valve passing-through air flow amount, and means for calculating the in-cylinder charged air amount of each cylinder by adding up the corresponding first and second air amounts together.

5. A control device for an internal combustion engine according to claim 3, wherein the control means calculates a variation correcting coefficient for each cylinder for compensating variation of the in-cylinder charged air amounts among the cylinders from the intake pressure drop, and controls the engine based on the variation correcting coefficient for each cylinder.

6. A control device for an internal combustion engine according to claim 1, wherein the intake pressure is an average value of intake pressure detected a plural number of times, the intake pressure drop detecting means cumulates the detected intake pressure for every given crank angle and stores the cumulative value of the intake pressure, calculates an average intake pressure for every given crank angle from the stored cumulative value, and calculates the intake pressure drop from the average intake pressure for every given crank angle.

7. A control device for an internal combustion engine according to claim 1, wherein the intake pressure drop detecting means judges whether the engine is operated under a preset reference condition, detects the intake pressure when it is judged that the engine is operated under the reference condition, and inhibits the detection of the intake pressure when it is judged that the engine is not operated under the reference condition.

8. A control device for an internal combustion engine according to claim 7, wherein it is judged that the engine is operated under the reference condition when an idling operation is in process.

9. A control device for an internal combustion engine according to claim 1, wherein the intake pressure drop detecting means converts the detected intake pressure into an intake pressure at the engine being operated under a preset reference condition, and calculates the intake pressure drop from the converted intake pressure.

10. A control device for an internal combustion engine according to claim 9, wherein it is judged that the engine is operated under the reference condition when an idling operation is in process.

11. A control device for an internal combustion engine according to claim 1, wherein the intake pressure drop detecting means detects timings at which upward peaks are formed in the intake pressure derivative, and sets to the peak pressure detecting range a range from a timing at which the upward peak is formed in the intake pressure derivative to a timing at which the next upward peak is formed.

12. A control device for an internal combustion engine according to claim 11, wherein the intake pressure drop detecting means sets a peak derivative detecting range for each cylinder, and detect the timing at which the upward peak is formed in the intake pressure derivative within the peak derivative detecting range.

13. A control device for an internal combustion engine according to claim 12, wherein the intake pressure drop detecting means sets the peak derivative detecting range based on an open timing of an intake valve.

14. A control device for an internal combustion engine according to claim 1, wherein the intake pressure drop detecting means sets a peak pressure detecting range for each cylinder based on the intake pressure derivative, detects the upward peak pressure of the intake pressure included in the upward peak pressure detecting range, and detects the downward peak pressure of the intake pressure included in the downward peak pressure detecting range.

15. A control device for an internal combustion engine according to claim 14, wherein the intake pressure drop detecting means detects timings at which upward and downward peaks are formed in the intake pressure derivative, sets the upward peak pressure detecting range to a range from a timing at which the upward peak is formed in the intake pressure derivative to a timing at which the next downward peak is formed and sets the downward peak pressure detecting range a range from to a timing at which the downward peak is formed in the intake pressure derivative to a timing at which the next upward peak is formed.

* * * * *

UNITED STATES PATENT AND TRADEMARK OFFICE

CERTIFICATE OF CORRECTION

PATENT NO. : 7,359,794 B2
APPLICATION NO. : 10/592312
DATED : April 15, 2008
INVENTOR(S) : Masashi Hakariya and Takashi Tsunooka It is certified that error appears in the above-identified patent and that said Letters Patent is hereby corrected as shown below:

Title Page; should read;

(73) Assignee: Toyota Jidosha Kabushiki Kaisha,
Toyota (JP)

Signed and Sealed this

Fifteenth Day of July, 2008

JON W. DUDAS
*Director of the United States Patent and Trademark Office*